A. PETERSON.
ROTARY MOTOR.
APPLICATION FILED MAY 9, 1912.
1,056,827.
Patented Mar. 25, 1913.
3 SHEETS—SHEET 1.
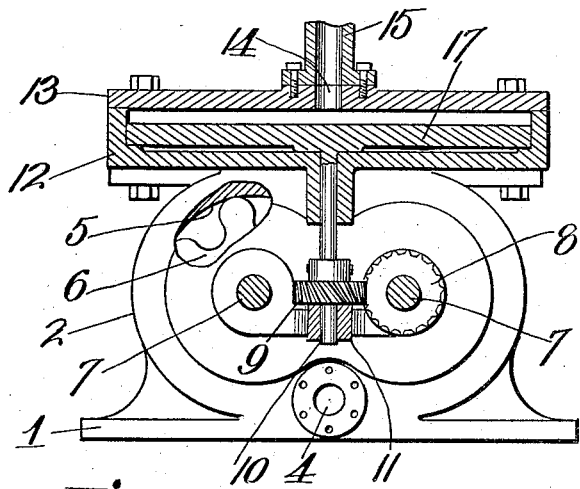
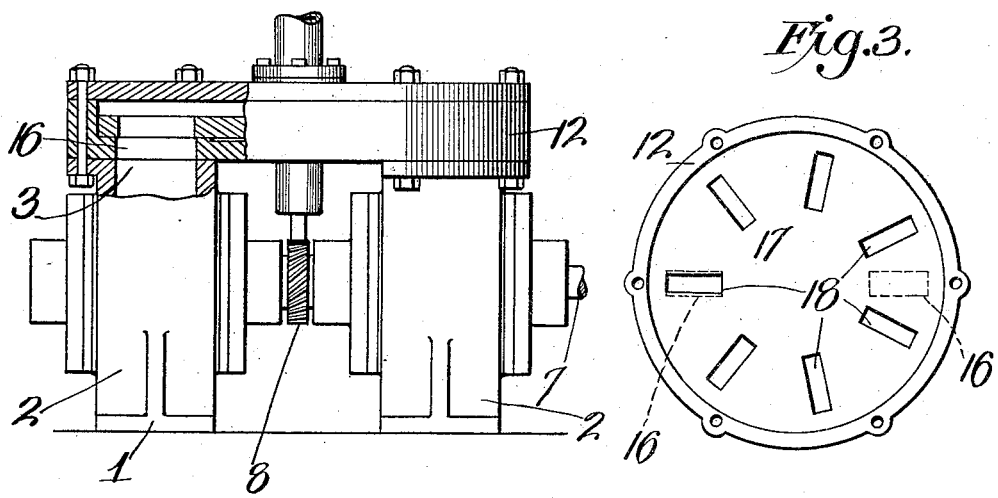
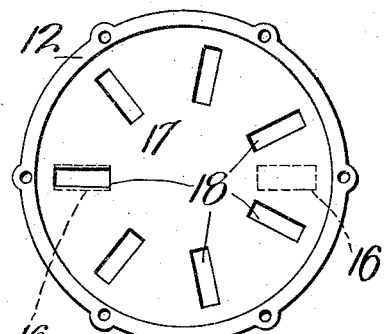
Witnesses
Frank R Glover
M. T. Preston
Inventor
Alfred Peterson
By George Thorpe Atty.

A. PETERSON.
ROTARY MOTOR.
APPLICATION FILED MAY 9, 1912.

1,056,827.

Patented Mar. 25, 1913.

3 SHEETS—SHEET 2.

Witnesses
Frank R Glon
M. K. Preston

Inventor
Alfred Peterson
By George Thorp Atty.

A. PETERSON.
ROTARY MOTOR.
APPLICATION FILED MAY 9, 1912.

1,056,827.

Patented Mar. 25, 1913.

3 SHEETS—SHEET 3.

Witnesses
Frank R Glow
M. N. Preston

Inventor
Alfred Peterson
By George H Thorpe Atty.

UNITED STATES PATENT OFFICE.

ALFRED PETERSON, OF INDEPENDENCE, MISSOURI.

ROTARY MOTOR.

1,056,827.   Specification of Letters Patent.   Patented Mar. 25, 1913.

Application filed May 9, 1912. Serial No. 696,124.

*To all whom it may concern:*

Be it known that I, ALFRED PETERSON, a citizen of the United States, residing at Independence, in the county of Jackson and State of Missouri, have invented certain new and useful Improvements in Rotary Motors, of which the following is a specification.

This invention relates to rotary motors of that class embodying a pair of intermeshing toothed pistons, and has for its chief object to produce a steam motor or engine consisting of twin cylinders each containing a pair of rotary intermeshing toothed pistons, and a valve for supplying steam alternately to said cylinders whereby the pistons of the cylinders shall be simultaneously driven by direct pressure of steam and the expansive force of steam.

With this general object in view the invention consists in certain novel and peculiar features of construction and organization as hereinafter described and claimed; and in order that it may be fully understood reference is to be had to the accompanying drawings, in which:—

Figure 4:
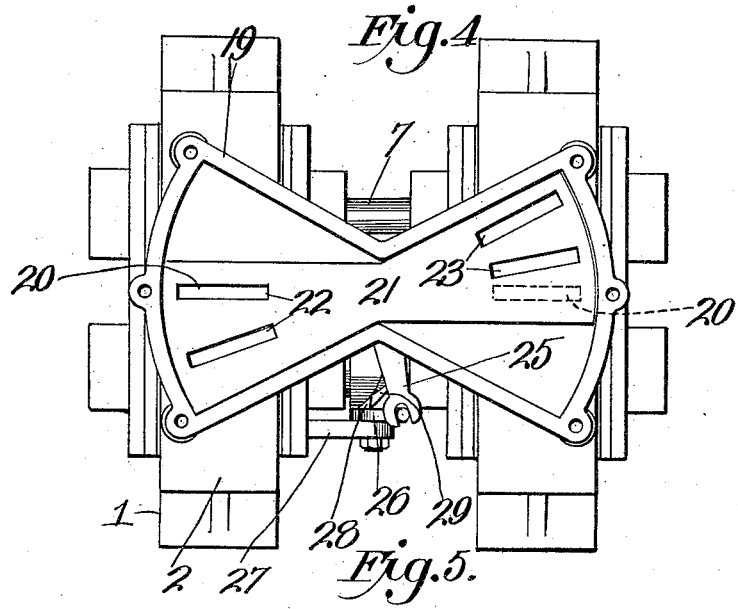
Figure 5:
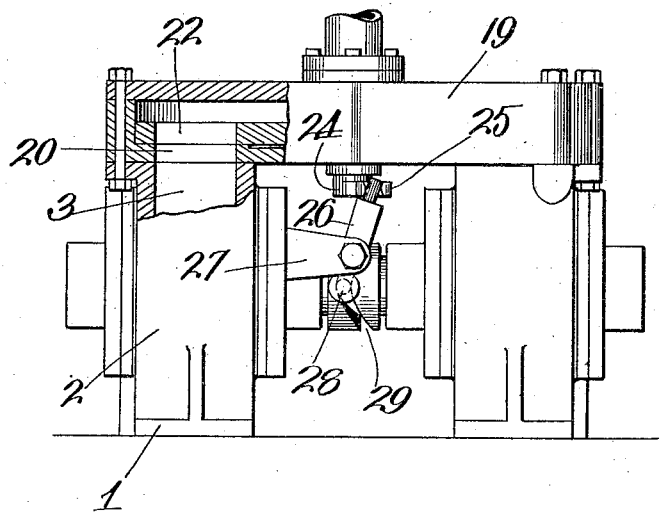
Figure 6:
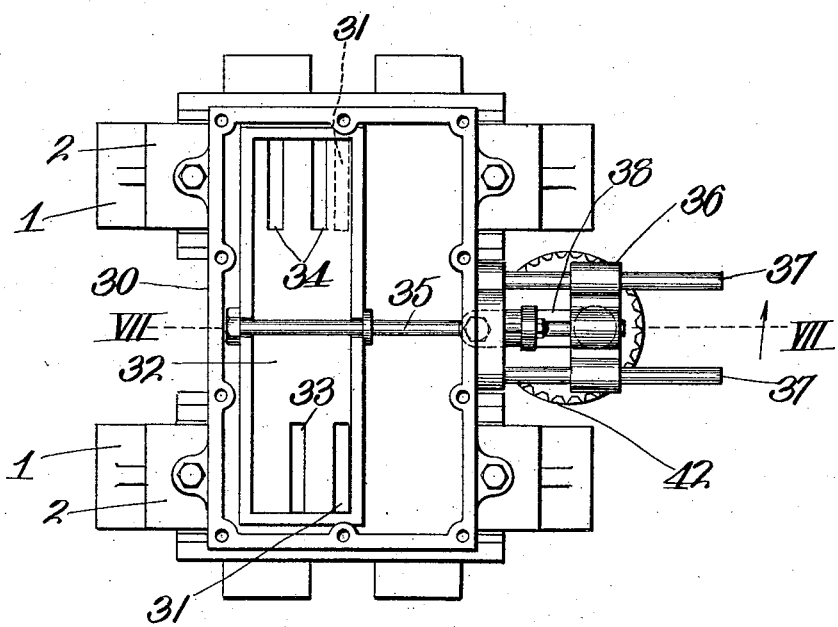
Figure 7:
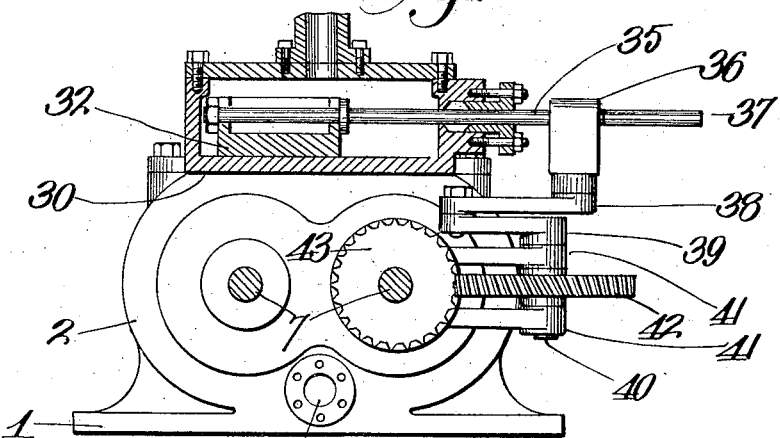

Figure 1, is a central vertical section of a rotary steam motor embodying my invention. Fig. 2, is an end view of the same partly in central transverse section. Fig. 3, is a top plan view of the steam chest and valve, the top of the chest being omitted. Fig. 4, is a top plan view of the motor as equipped with an oscillatory valve, the top of the steam chest being omitted. Fig. 5, is an end view of the construction shown by Fig. 4, and partly in central transverse section. Fig. 6, is a top plan view of the engine equipped with a reciprocatory valve, the top of the steam chest being omitted. Fig. 7, is a vertical section on the line VII—VII of Fig. 6.

In the said drawings, 1 indicates the base of the motor or engine and 2 twin cylinders thereon, of elliptic form and provided with intake ports 3 and exhaust ports 4, the interior of the cylinder being in the form of two intersecting circular chambers 5 which communicate in the vertical plane of the ports 3 and 4, and arranged in said chambers are intermeshing toothed pistons 6 mounted upon suitably journaled parallel shafts 7. In Sheet 1, one of the shafts 7 is provided with a worm wheel 8, meshing with a worm wheel 9 on a vertical shaft 10 journaled at its lower end in a bearing 11 rigid with the cylinders and at its upper end in a circular steam chest 12 secured as shown or otherwise upon the cylinders. The chest has a removable top 13 provided with an inlet port 14 with which a steam supply pipe 15 communicates, and said chest is also provided in its bottom with a pair of discharge ports 16 communicating with the intake ports 3 of the cylinders.

17 is a circular valve arranged in the steam chest and provided with radially arranged ports or openings 18, corresponding in number to the teeth on each piston, the distance between the inner ends of adjacent ports 18 being such that one of said ports will always register with one of the ports 16 of the steam chest, so that when steam is permitted to enter the chest it shall instantly enter one of the cylinders and start the operation of the motor, which operation through the gearing described, is instantly transmitted to the valve. In such operation ports of the valve alternately communicate with ports 16 of the cylinders and thus in each revolution the valve (as shown) supplies eight charges of steam to each cylinder, one charge to each space or pocket between the teeth of the pistons, and it will be understood that as the charges are supplied alternately to the cylinders that, as one of the pistons is turning under direct pressure the other one is turning under the expansion of the charge of steam last delivered to it, and that consequently each piston is given in each revolution eight impulses by direct pressure of steam and a corresponding number of impulses by the expansive forces of steam, the steam carried around by the spaces or pockets between the teeth, escaping through the exhaust ports 4.

Referring now to Sheet 2, it will be seen that the steam chest numbered 19 is in the form of two opened fans with their attenuated ends juxtaposed and communicating, the discharge ports of said chest corresponding in location to and arranged in the same location as the ports 16 of steam chest 12, the said discharge ports of steam chest 19 being numbered 20. The valve 21 of chest 19 is of double fan shape but narrower than the chest so as to be capable of oscillation therein, and is provided at diametrically opposite points with pairs of ports 22 and 23. The valve is provided centrally with a depending shaft 24 terminating in a forked crank arm 25, engaging the upper end of a rock lever 26, mounted on a bracket 27, projecting from one of the cylinders. The other end of the rock lever 26 is provided with a pin 28 engaging a grooved cam 29 mounted on one of the shafts of the pistons, the arrangement being such that rotation of said shaft shall impart rocking movement to the lever so that the latter shall rock or oscillate crank arm 25 and hence valve 21. In the rocking of the valve, one of the ports 22 registers with the port 20, and just before said port 22 passes out of engagement with said other port 20, one of the ports 23 comes into register with the other port 20, and just before said port 23 passes out of engagement with said other port 20, the other port 22 moves into register with the first-named port, and just before the last-named port 22 moves out of communication with said port 20, the second port 23 moves into communication with the second port 20. All of this occurs in one oscillation of the valve, and as the reverse oscillation takes place the action is repeated but in reverse order with respect to the time of establishment of communication between one of the ports 20 and ports 22 and the other port 20 and ports 23, as will be readily understood. In this construction, as in that of Sheet 1, the ports will be so proportioned that direct pressure of steam will always be applied on one of the pistons and the other will be simultaneously operated under expansion of steam. It will also be understood that the parts are so proportioned that each peripheral pocket of each piston will receive a charge of steam under direct pressure in each complete revolution of its respective piston, as has been explained with respect to the construction shown by Sheet 1.

Referring now to Sheet 3, 30 is a steam chest provided with discharge ports 31 communicating with the two cylinders. 32 is a slide valve in the chest provided with two sets of ports 33 and 34 so proportioned and arranged that the ports of the sets shall communicate alternately with the two cylinders, as explained with respect to the construction shown by Sheet 2. The arrangement is also such that the valve cannot stop on center, that is to say, one of its ports will always be in engagement with one of the cylinder ports so that each piston shall be given sixteen impulses, eight by direct pressure of steam and eight under the expansive force of steam. 35 indicates the stem of the valve secured to a cross head 36 mounted slidingly on guides projecting from one side of the steam chest, and pivoted to said cross head is a link 38 pivotally connected to the free end of a crank 39 secured on the upper end of a vertical shaft 40 journaled in bearings 41 projecting from one of the cylinders, and secured on said shaft is a worm wheel 42 meshing with a worm wheel 43 upon one of the piston shafts, the arrangement being such that power is transmitted from the piston shafts through said gearing to shaft 40, and thence translated through crank arm 39 and link 38 into reciprocatory movement of the cross head and valve.

From the above description it will be apparent that the principle of construction in the rotary valve, the oscillatory valve and the reciprocatory valve, in conjunction with the twin cylinder and peripherally toothed pistons is the same, in that each valve supplies fluid under pressure alternately to the pistons and in sequence to the pockets thereof, and also in that each charge where steam is used not only imparts a direct impulse to each piston but also under expansion, imparts a second impulse to the piston, and it is to be understood that I reserve the right to make such changes as properly fall within the spirit and scope of the appended claims.

I claim:

1. In a rotary motor, the combination of a pair of cylinders having intake ports, a chest to receive fluid under pressure having ports in communication with said intake ports, parallel shafts common to both cylinders, a rotary piston rigidly secured on each shaft in each cylinder and provided with peripheral intermeshing teeth, and a valve in the chest, provided with a plurality of ports so arranged that communication shall be opened and closed between the chest and each cylinder alternately and so arranged that one of the ports of the valve shall open communication between the chest and one cylinder before another port of said valve has closed communication between the chest and the other cylinder.

2. In a rotary motor the combination of a pair of cylinders provided with intake ports, parallel shafts common to both cylinders, intermeshing peripherally toothed pistons on each shaft in each cylinder, a chest having ports in communication with the cylinders through the peripheries thereof, a valve movable in a plane at right angles to the plane of movement of the pistons and provided with a plurality of ports, and automatic means for operating the valve to cause the same to supply fluid intermittently to each cylinder under direct pressure, the ports of the valve being so arranged that one of them shall begin to establish communication between the chest and one cylinder before another of the ports of the valve closes communication between the chest and the other cylinder.

In testimony whereof I affix my signature, in the presence of two witnesses.

ALFRED PETERSON.

Witnesses:
 M. K. PRESTON,
 G. Y. THORPE.

---

Copies of this patent may be obtained for five cents each, by addressing the " Commissioner of Patents, Washington, D. C."